(No Model.)

L. D. JONES.
STEAM COOKING UTENSIL.

No. 345,307. Patented July 13, 1886.

Witnesses:
J. B. McGinn
A. H. Cooper

Inventor:
Lavenia D. Jones
By her Atty
R. D. O. Smith

N. PETERS, Photo-Lithographer, Washington, D. C.

UNITED STATES PATENT OFFICE.

LAVENIA D. JONES, OF LAFAYETTE, INDIANA.

STEAM COOKING UTENSIL.

SPECIFICATION forming part of Letters Patent No. 345,307, dated July 13, 1886.

Application filed April 1, 1886. Serial No. 197,455. (No model.)

*To all whom it may concern:*

Be it known that I, LAVENIA D. JONES, of Lafayette, in the county of Tippecanoe and State of Indiana, have invented new and useful Improvements in Cooking Utensils, Especially Adapted to use with Oil or Gas Stoves; and I do hereby declare that the following is a full and accurate description of the same, reference being had to the accompanying drawings, wherein—

Figure 1:
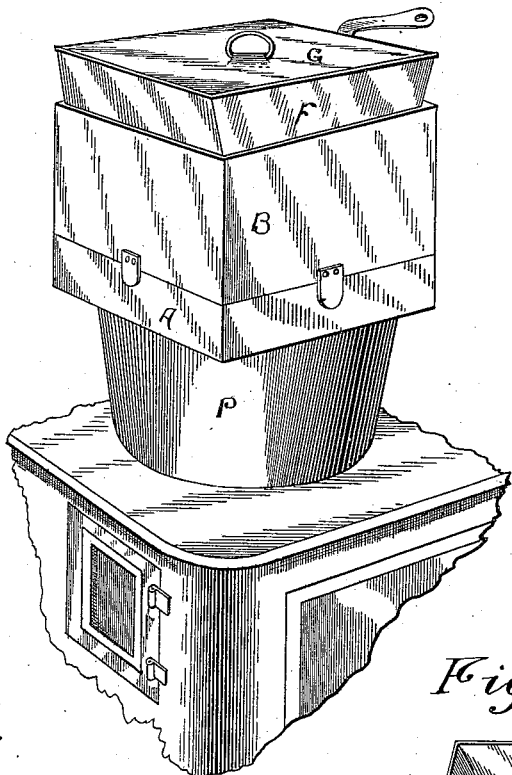
Figure 2:
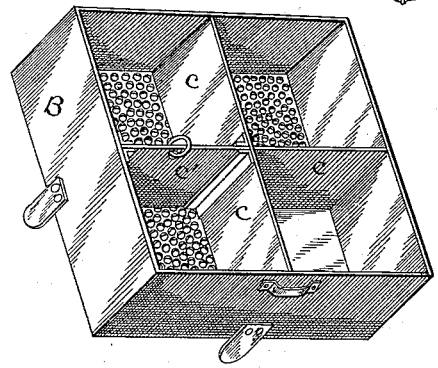
Figure 3:
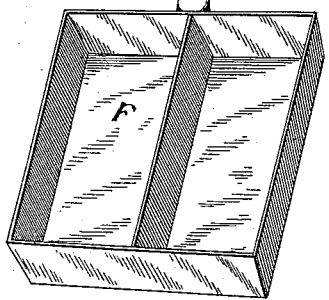
Figure 4:
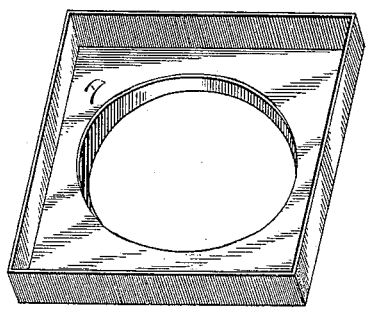

Figure 1 is a perspective view of my cooking utensil. Figs. 2, 3, and 4 are perspective views of the parts detached.

My invention belongs to that class of cooking utensils called "steamers," because steam admitted through the lower compartment and commonly generated in an ordinary pot is the agent for conveying heat to and cooking food substances placed in the upper compartment.

I am aware that steam-cookers have been made heretofore and in considerable variety, and I therefore do not propose to claim anything more than the structure and arrangement which I have invented, and particularly described hereinafter.

I have adapted my steam-cooker to be set on an ordinary pot of any size within which the steam is generated, because this way is most convenient and economical, though it is apparent that a special generator can be employed, if desired.

A is the bottom section, being a box with a small hole in its bottom, and a marginal flange adapted to fit the top of any sized pot or kettle, P. The section A receives and distributes the steam under every part of section B, which is adapted to set upon the upper edge of section A. The section B is divided into four compartments by partitions $c\ c\ c\ c'$, and two or three of these compartments have perforated bottoms to admit the steam to pass up freely from section A. The partition $c'$ between two adjoining chambers with perforated bottoms is made loose and easily removable, so as to make these two chambers into one for the admission of corn on the cob or like food material too large to be admitted into one of said compartments. In the compartments having perforated bottoms any food substance may be cooked which will bear the direct application of steam, and in the compartment having a close bottom fruits or substances to which steam cannot be applied directly may be placed. In this way a variety of food substances may be cooked simultaneously without inconvenience or objection.

A pan, F, having a partition to divide it into two chambers, is fitted to cover and close the chambers in section B, so that the steam which rises through said section B will be arrested by the pan F, which thus acts as a hollow cover for the steamer, and water or food may be warmed or cooked in its compartments.

The lid G fits on and tightly closes the pan F, or, in case said pan is not in use, it fits and closes the steamer B.

The pan F is provided with a handle, and the section B may also be so provided, if desired, and also with lugs $d$ to inclose the sides of the section A and retain section B in place thereon.

Having described my invention, I claim as new—

1. The open bottom section, A, adapted to set on the top of any size pot or kettle, combined with the steamer-section B, divided into compartments by the partitions $c\ c\ c'$, the latter of which is removable, two or more of said compartments having perforated bottoms, and one of said compartments being close, and a cover-lid to close the whole, substantially as and for the purpose set forth.

2. The section A, provided with an open bottom adapted to set on the top of an ordinary cooking-pot, the section B, divided into four compartments, one close and three open bottomed, and a removable partition, $c'$, whereby two of said compartments may be thrown into one, combined with the covering section-pan F, divided into compartments, and a lid, G, substantially as set forth.

LAVENIA D. JONES.

Witnesses:
S. I. JOHNSON,
M. A. JOHNSON.